United States Patent [19]

Watanabe et al.

[11] 4,165,801
[45] Aug. 28, 1979

[54] STATIC LEONARD SYSTEM

[75] Inventors: Eiki Watanabe; Tooru Tanahashi, both of Inazawa, Japan

[73] Assignee: Mitsubishi Denki Kabushiki Kaisha, Tokyo, Japan

[21] Appl. No.: 831,677

[22] Filed: Sep. 8, 1977

[30] Foreign Application Priority Data

Sep. 24, 1976 [JP] Japan .................. 51-114926

[51] Int. Cl.² .......................................... B66B 5/02
[52] U.S. Cl. ............................ 187/29 R; 318/331; 318/459; 361/33
[58] Field of Search ............... 318/449, 368, 450, 459, 318/331, 453, 479; 361/30, 33, 60, 72, 90, 92; 307/130

[56] References Cited

U.S. PATENT DOCUMENTS

| | | | |
|---|---|---|---|
| 2,709,772 | 5/1955 | Fisher et al. | 318/474 |
| 3,727,103 | 4/1973 | Finch et al. | 361/30 |
| 3,778,694 | 12/1973 | Hubby et al. | 318/474 |
| 3,800,202 | 3/1974 | Oswald | 361/33 |
| 3,961,688 | 6/1976 | Maynard | 187/29 R |
| 4,027,202 | 5/1977 | Tyler et al. | 361/92 |
| 4,047,234 | 9/1977 | Oyler | 361/92 |

Primary Examiner—David Smith, Jr.
Attorney, Agent, or Firm—Wenderoth, Lind & Ponack

[57] ABSTRACT

The disclosed Leonard type elevator system comprises a reversible converter for controllably driving a DC motor, and an AC voltage detector and a DC voltage detector connected to the AC and DC sides of the converter respectively for detecting the voltages developed on the respective sides of the converter. When a difference in detected voltage between the two detectors exceeds a predetermined magnitude due to a decrease in the AC source voltage, a comparator produces an output serving to disconnect the DC motor from the converter. Also the comparator may produce such an output when the converter receives regenerative power from the DC motor.

13 Claims, 2 Drawing Figures

STATIC LEONARD SYSTEM

BACKGROUND OF THE INVENTION

This invention relates to improvements in a Leonard type elevator system.

In reversible Leonard type elevator systems a decrease in the source voltage and the failure of the power supply when the converter receives regenerative power from an associated DC motor leads to a fear that the thyristors cannot turn off and thereby permitting rush currents to flow thereinto resulting in their destruction. In order to avoid this feared result, it is a common practice to provide on Leonard systems an undervoltage detector designed and constructed so that it responds to an AC voltage less than a predetermined magnitude to interrupt the main circuit on the DC side. If the output voltage from the Leonard type elevator system is low, a more or less decrease in AC voltage has caused the undervoltage detector to interrupt the main circuit although the converter is able to controllably drive the DC motor connected thereto. Particularly, in such Leonard systems used with the elevator system this interruption of the main circuit has resulted in the emergency stoppage of the elevator car involved. This has shocked passengers in the elevator car causing them uneasiness. Therefore it is desirable to make the number of emergency stops as small as possible.

Accordingly it is an object of the present invention to eliminate the objections to the prior art practice as above described by the provision of a new and improved Leonard type elevator system for stably operating an elevator car involved without the emergency stoppage of the elevator car each time the AC voltage supplied to the system decreases.

SUMMARY OF THE INVENTION

The present invention provides a Leonard type elevator system comprising, in combination an elevator car, a counter weight, a rope connected between said elevator car and said counter weight, and a sheave over which said rope is trained; a converter means including a plurality of semiconductor controlled rectifiers to convert an alternating current to a direct current having a variable voltage, a DC motor connected to the converter means to be controlled with the variable voltage having a shaft connected directly to the sheave for control of the position of the elevator car, a set of contacts connected between the converter means and the DC motor for opening the DC circuit with the DC motor, an AC voltage detector means connected to the AC side of the converter means to detect the AC voltage developed thereon to produce a first DC voltage corresponding to the AC voltage, a DC voltage detector means connected to the DC side of the converter means to detect the DC voltage developed thereon to produce a second DC voltage corresponding to the detected DC voltage, and a comparator means connected to both detector means to compare the first and second DC voltages with each other to produce an output when the difference between the first and second DC voltages exceeds a predetermined magnitude, said set of contacts being put in the open position in response to the output from the comparator means to stop said DC motor.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
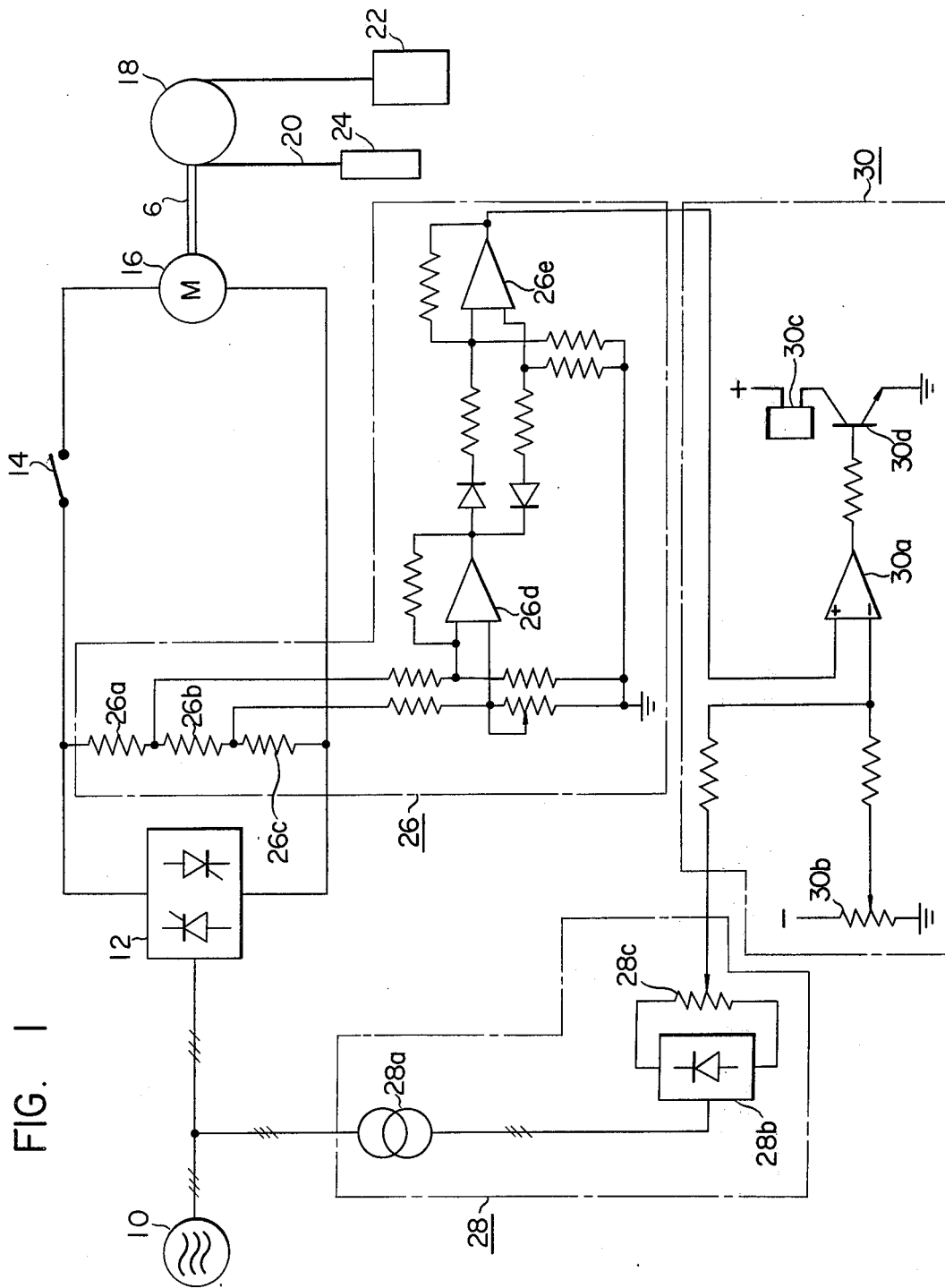
FIG. 1 is a circuit diagram of a Leonard type elevator system constructed in accordance with the principles of the present invention.

Referring now to FIG. 1 of the drawings, there is illustrated a Leonard type elevator system constructed in accordance with the principles of the present invention as applied to an elevator system. However it is to be understood that the present invention is not restricted thereto or thereby. The arrangement illustrated comprises an AC source shown as being of a three phase type, and a converter 12 including of a plurality of semiconductor controlled rectifiers in this case thyristors, and having an input connected across the source 10 and an output connected across a series combination of a switch set 14 of a contactor (not shown) and a DC motor 16 for a hoist. The hoist includes a sheave 18 directly connected to a shaft 6 of DC motor and having a rope 20 trained over the same. The rope 20 is connected at one end to an elevator car 22 and at the other end to a counter weight 24.

The output of the converter 12 is also connected across a plurality of, in this case, three voltage dividing resistors 26a, 26b and 26c serially interconnected and included in a DC voltage detector generally designated by the reference numeral 26. The DC voltage detector 26 further includes an operational amplifier 26d having a pair of inputs connected to the junction of the resistors 26a and 26b and that of the resistors 26b magnitude of and 26c respectively in the manner illustrated in FIG. 1 and another operational amplifier 26e connected to the operational amplifier 26d. As shown in FIG. 1, the operational amplifier 26e includes a pair of inputs connected to the output of the operational amplifier 26d through respective semiconductor diodes and resistors serially interconnected with the diodes having the opposite polarity to each other. Thus the operational amplifier 26e is operative to produce an output corresponding to the absolute magnitude of the output from the operational amplifier 26d.

The source 10 is further connected to an AC voltage detector generally designated by the reference numeral 28. The AC voltage detector 28 includes a step-down transformer 28a having a primary winding connected to the source 10 and therefore the AC side of the converter 12 and a secondary winding connected to a rectifier bridge 28b formed of semiconductor diodes, the bridge being subsequently connected across a potentiometer 28c provided with a movable tap. The movable tap on the potentiometer 28c is connected to a comparator generally designated by the reference numeral 30.

The comparator 30 includes a comparison amplifier 30a having a negative input coupled to the movable tap on the potentiometer 28c and also to a movable tap on a resistor 30b providing a point of reference potential. The comparison amplifier 30a includes a positive input connected to an output of the operational amplifier 26e in the DC voltage detector 26 to compare the voltages developed at the two inputs with each other. The amplifier 30a includes an output connected to a base electrode of a NPN type transistor 30d in a common emitter circuit including a collector electrode connected to an operating relay winding 30c. The winding 30c is connected to the positive side of the DC source. Relay winding 30c controls the energization of the contractor (not shown) controlling switch 14 so that when relay winding 30c is energized the contractor is deenergized and switch 14 is opened.

Assuming that the importance on the AC side and the commutation overlapping angle thereof extert only a negligible effect, the converter 12 has a maximum value output voltage Edo expressed by $$Edo = K \cdot Vac \quad (1)$$

where K designates a constant determined by the converter 12 and Vac designates the effective value of the AC voltage applied across the converter 12. Also assuming that Ed designates the output voltage from the converter 12, the latter is controllable when the relationship Edo>Ed holds. In other words, it is not required to effect as emergency stop of the elevator car 22 as long as the relationship $$k \cdot Vac > Ed \quad (2)$$

holds

In the arrangement of FIG. 1 the AC voltage detector 28 detects the AC voltage developed on the AC side of the converter 12 which is normally equal to the AC voltage across the source 10. More specifically, the AC voltage is stepped down by the transformer 28a and full-wave rectified by the rectifier bridge 28b. Thus the potentiometer 28c has developed thereacross a first DC voltage corresponding to the AC voltage. On the other hand, the DC voltage detector 26 detects the DC voltage developed on the DC side of the converter 12 to produce at the output of the operational amplifier 26e a second DC voltage providing a measure of the detected DC voltage. Then the comparator 30 compares the first and second DC voltages with each other. It is to be noted that the switch 14 is in its closed position during the normal operation of the elevator car 22.

During the operation of the elevator car 22, the voltage across the AC source 10 may be lowered to decrease the first DC voltage across the potentiometer 28c in the AC voltage detector 28. Under these circumstances, the output from the comparison amplifier 30a remains negative as long as the expression (2) holds. Therefore the transistor 30d remains non-conducting preventing the energization of the relay winding 30c. Thus the elevator car 22 continues to travel because the switch 14 is maintained in its closed position.

On the contrary, if the AC voltage across the source 10 is lowered enough to fail to hold the expression (2) then the difference between the output from the operational amplifier 26e and the output from the potentiometer 28c exceeds the reference potential set by the resistor 30b. This causes the output from the comparison amplifier 30a the change from a negative to a positive polarity. When the output from the amplifier 30a changes to a positive polarity, the transistor 30d conducts to energize the relay winding 30c with the result that the contactor (not shown) is deenergized to bring the switch 14 into its open position. Thereby the motor 16 disengages from the converter 12 while at the same time a brake (not shown) may on the act shaft 16 resulting in the emergency stoppage of the elevator car 22.

From the foregoing it is seen that in the arrangement of FIG. 1 the circuit with the motor 16 is not uselessly opened as long as the converter 12 is able to controllably drive the DC motor. However if the converter 12 is unable to controllably drive the DC motor then the circuit with the motor 16 is immediately opened whereby the controlled rectifiers are prevented from destruction.

Figure 2:
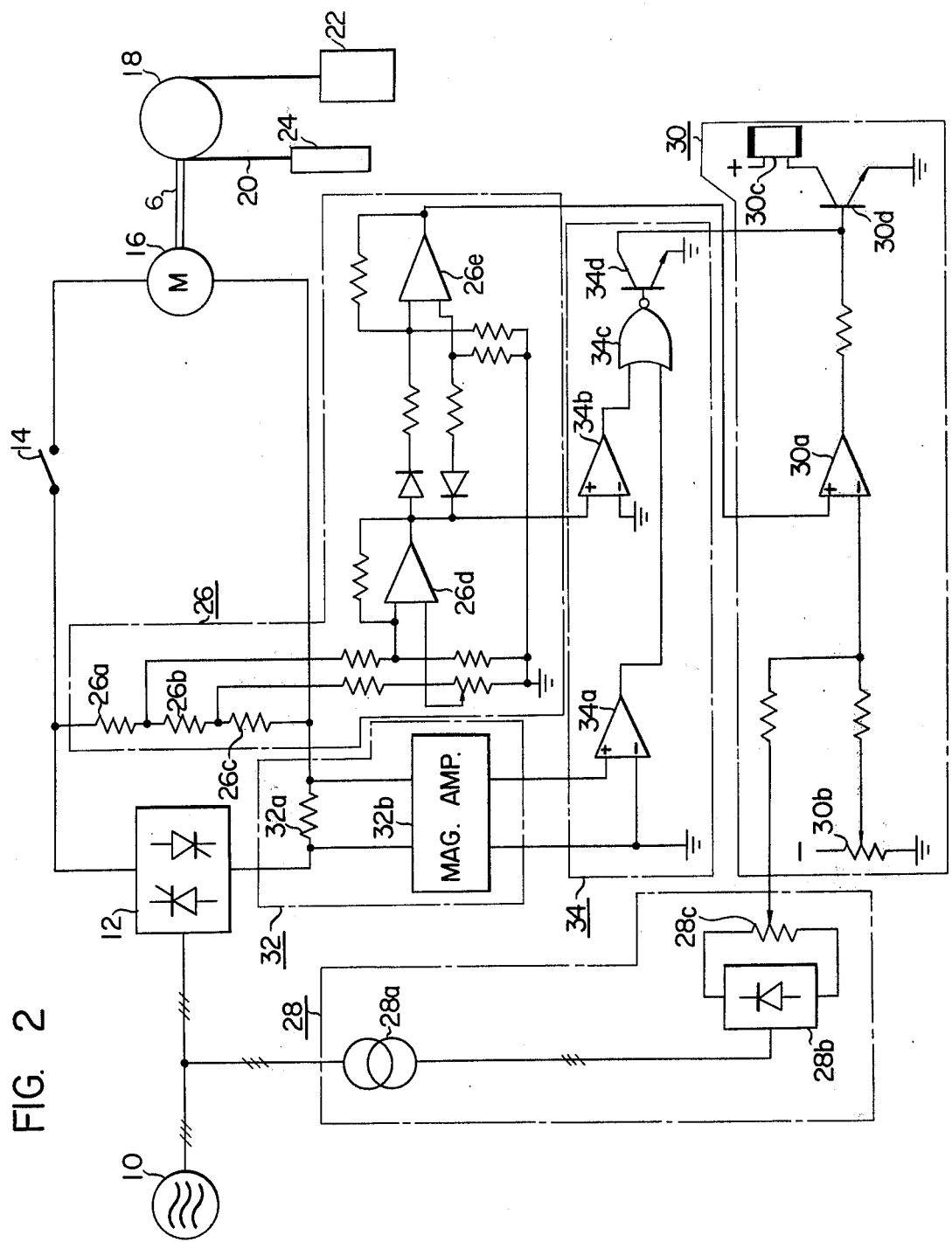
FIG. 2 is a diagram similar to FIG. 1 but illustrating a modification of the present invention.

FIG. 2, wherein like reference numerals designate the components identical or corresponding to those shown in FIG. 1, illustrates a modification of the present invention particularly suitable for use with elevator systems. The arrangement illustrated is different from that shown in FIG. 1 only in that in FIG. 2, a current detector generally designated by the reference numeral 32 is connected between the converter 12 and the voltage dividing resistor 26c and a regenerative mode sensor generally designated by the reference numeral 34 is connected to the current detector 32 to sense whether or not the converter 12 receives regenerative power from the DC motor.

As shown in FIG. 2, the current detector 32 includes an input resistor 32a connected between the converter 12 and the voltage dividing resistor 26c and hence the motor's armature 16, and a magnetic amplifier 32b of conventional construction connected across the input resistor 32a. The magnetic amplifier 32a is connected to a comparison amplifier 34a disposed in the regenerative mode sensor 34.

The comparison amplifier 34a includes a positive input connected to one of the pair of output terminals of the magnetic amplifier 32b and a negative input connected to the other output terminal of the magnetic amplifier 32b and also to ground. The regenerative mode sensor 34 further includes another comparison amplifier 34b including a positive input connected to the output of the operational amplifier 26d and a negative input connected to ground. Then the outputs of the comparison amplifiers 34a and 34b are each connected to a pair of inputs to an exclusive "NOR" circuit 34c respectively. The exclusive "NOR" circuit 34c is connected at the output to the base electrode of a NPN transistor 34d in a common emitter circuit including a collector electrode connected to the base electrode of the NPN transistor 30d disposed in the comparator 30.

The current detector 32 is operative to detect the current flowing through the motor 16 while the regenerative mode sensor 34 is responsive to the outputs from current detector 32 and voltage detector 26 to determine if the converter 12 receives regenerative power from the DC motor. When the converter 12 provides generative power to the DC motor as determined by the regenerative mode sensor 34, the transistor 34d is turned on. However when the regenerative mode sensor 34 has determined that the converter 12 receives regenerative power from the DC motor, the transistor 13d is put in its OFF state.

It is assumed that, during the travel of the elevator car 22, the AC voltage across the source 10 drops so that the outputs from the detectors 26 and 28 do not satisfy the expression (2). Under the assumed condition, the transistor 30d included in the comparator 30 remains in its OFF state as long as the converter 12 provides generative power to the DC motor for the following reasons: With the converter 12 providing generative power to the DC motor, the output from the operational amplifier 26d in the voltage detector 26 has the same polarity as that from the magnetic amplifier 32b. Therefore the exclusive "NOR" circuit 34c delivers a high or positive output to the transistor 34d to cause the latter to conduct. Under these circumstances, the transistor 30d remains nonconducting even though the comparison amplifier 30d provides an output with the positive polarity.

Therefore the relay winding 30c is kept deenergized to hold the main contactor (not shown) energized thereby to keep the contact set 14 in its closed position.

On the other hand, when the converter 12 receives regenerative power from the DC motor, as determined by the regenerative mode sensor 34, the output from the operational amplifier 26d is different in polarity from that provided by the magnetic amplifier 32b. This causes the exclusive "NOR" circuit 34c to deliver a low or null output to the transistor 34d to maintain the latter in its OFF state. Under these circumstances, when the output from the comparison amplifier 30d is changed to the positive polarity, the transistor 30d is turned on. Thus the relay winding 30c is energized to deenergize the main contactor (not shown) thereby to put the switch 14 in its open position resulting in the stoppage of the elevator car.

If the source voltage drops during the travel of the elevator car enough to fail to hold the expression (2), then the converter 12 is not able to controllably drive the DC motor but there is no fear that any of controlled rectifiers will be damaged. This is because, at that time, currents flowing through the controlled rectifiers immediately become null. When the source voltage is again restored to its normal magnitude, the converter 12 is again enabled.

During the disabling of the converter 12 the elevator car 22 will freely fall in accordance with the relationship between loading on the car 22 and the weight of the counter weight 27. If the source voltage is decreased for a short time interval then the elevator car 22 undergoes a small in change in speed, while if the decrease in source voltage continues for a long time interval then another safety device (not shown) installed on the elevator system is operated. Thus the passenger or passengers in the elevator car 22 can be kept safe. Accordingly it is not required to effect the emergency stoppage of the elevator car 22 as long as the converter 12 is operated in the conversion mode.

From the foregoing it is seen that the present invention provides a Leonard type elevator system operative to open the DC circuit with the DC motor when the difference between the voltage on the AC side of the converter and that on the DC side thereof exceeds a predetermined magnitude. Therefore the controlled rectifiers disposed in the converter can be prevented from being damaged by opening the circuit with the DC motor only when the converter is not able to controllably drive the DC motor. Also since the circuit with the DC motor is opened only when the converter receives regenerative power from the DC motor, any useless emergency stoppage of the elevator systems or the like to which the present invention is applied can be avoided.

While the present invention has been illustrated and described in conjunction with a few preferred embodiments thereof it is to be understood that numerous changes and modifications may be resorted to without departing from the spirit and scope of the present invention.

What we claim is:

1. A Leonard type elevator system comprising, in combination: an elevator car, a counter weight, a rope connected between said elevator car and said counter weight, and a sheave over which said rope is trained; a converter means including a plurality of semiconductor controlled rectifiers for converting an alternating current to a direct current having a variable voltage; a switch means connected to said converter means for opening the DC circuit thereof; a DC motor connected to said converter means and said switch means to be controlled with said variable voltage, including a shaft connected directly to said sheave for controlling the position of said elevator car; an AC voltage detector means connected to the AC side of said converter means for detecting the AC voltage developed thereon and for producing a first DC voltage corresponding to the AC voltage; a DC voltage detector means connected to the DC side of said converter means for detecting the DC voltage developed thereon and for producing a second DC voltage corresponding to the detected DC voltage; and a comparator means connected to said switch means, said AC voltage detector means and said DC voltage detector means for comparing said first and second DC voltages with each other and for causing said switch means to open the DC circuit of said converter means and said DC motor to stop said DC motor when the difference between said first DC voltage and said second DC voltage exceeds a predetermined magnitude.

2. A Leonard type elevator system as claimed in claim 1 wherein said converter means includes a plurality of thyristors.

3. A Leonard type elevator system as claimed in claim 1 wherein said AC voltage detector means comprises: a step-down transformer having a primary winding connected to the AC side of said converter means and a secondary winding; a semiconductor diode bridge having an AC input connected across said secondary winding of said step-down transformer, and a DC output; and a potentiometer connected across said DC output of said semiconductor diode bridged for producing said first DC voltage.

4. A Leonard type elevator system as claimed in claim 1 wherein said DC voltage detector means comprises; a plurality of voltage dividing resistors serially interconnected across the DC side of said converter means; and an operational amplifier means connected to said plurality of voltage dividing resistors for producing said second DC voltage.

5. A Leonard type elevator system as claimed in claim 1 wherein said comparator means comprises: a reference voltage means for generating a predetermined reference voltage; a comparison amplifier having a first input receiving said reference voltage and said first DC voltage, a second input receiving said second DC voltage and an output for producing an output signal when the difference between said first and second DC voltages exceeds said reference voltage; a transistor having a base electrode connected to said output of said comparison amplifier for being energized by said output signal of said comparison amplifier; and a control relay connected to said transistor and said switch means for opening said switch means when said transistor is energized.

6. A Leonard type elevator system comprising in combination: an elevator car, a counter weight, a rope connected between said elevator car and said counter weight, and a sheave over which said rope is trained; a converter means having a plurality of semiconductor controlled rectifiers for converting an alternating current to a direct current having a variable voltage; a switch means connected to said converter means for opening the DC circuit thereof; a DC motor connected to said converter means and said switch means to be controlled with said variable voltage; a regenerative mode detector means for detecting when said converter means receives regenerative power from said DC motor; an AC voltage detector means connected to the AC side of said converter means for detecting the AC voltage developed thereon and for producing a first DC voltage corresponding to the AC voltage; a DC voltage detector means connected to the DC side of said converter means for detecting the DC voltage developed thereon and for producing a second DC voltage; and a comparator means connected to said switch means, said regenerative mode detector means, said AC voltage detector means and said DC voltage detector means for comparing said first and second DC voltages with each other and for causing said switch means to open the DC circuit of said comparator means and said DC motor to stop said DC motor when the difference between said first DC voltage and said second DC voltage exceeds a predetermined magnitude and said regenerative mode detector detects regenerative power received by said converter means from said DC motor.

7. A Leonard type elevator system as claimed in claim 6, wherein said plurality of semiconductor controlled rectifiers of said converter means comprise a plurality of thyristors.

8. A Leonard type elevator system as claimed in claim 6 wherein said AC voltage detector means comprises: a step-down transformer having a primary winding connected to the AC side of said converter means and a secondary winding; a semiconductor diode bridge having an AC input connected across said secondary winding of said step-down transformer, and a DC output; and an output resistor connected across said DC output of said semiconductor diode bridge for producing said first DC voltage.

9. A Leonard type elevator system as claimed in claim 6 wherein said DC voltage detector means comprises; a plurality of voltage dividing resistors serially interconnected across the DC side of said converter means; and an operational amplifier means connected to said plurality of voltage dividing resistors for producing said second DC voltage.

10. A Leonard type elevator system as claimed in claim 6 wherein said comparator means comprises: a reference voltage means for generating a predetermined reference voltage; a comparison amplifier having a first input receiving said reference voltage and said first DC voltage, a second input receiving said second DC voltage and an output for producing an output signal when the difference between said first and second DC voltages exceeds said reference voltage; a transistor having a base electrode connected to said output of said comparison amplifier for being energized by said output signal of said comparison amplifier; and a control relay connected to said transistor and said switch means for opening said switch means when said transistor is energized.

11. A Leonard type elevator system as claimed in claim 6 wherein said regenerative mode detector means comprises; a current detector means for detecting the current flowing through an armature of said electric motor; and wherein said regenerative mode detector means is connected to said DC voltage detector means and detects the receipt of regenerative power by said conversion means form said DC motor in accordance with both said current detected by said current detector means and said voltage detected by said DC voltage detector means.

12. A Leonard type elevator system as claimed in claim 11 wherein said regenerative mode detector means further comprises; a first amplifier having an input connected to said current detector means; a second amplifier having an input connected to said DC voltage detector means; an exclusive "NOR" circuit having a pair of inputs connected to the outputs of said first and second amplifiers for producing an output signal when the outputs of said first and second amplifier have the same polarity; and an output transistor connected to the output of said exclusive "NOR" circuit and to said swtich means for inhibiting the operation of said switch means when said exclusive "NOR" circuit produces an output signal.

13. A Leonard type elevator system as claimed in claim 11 wherein said current detector means comprises: an input resistor connected between said converter means and an armature of said DC motor; and a magnetic amplifier connected across said input resistor for producing an output proportional to the current flowing through said input resistor.

* * * * *